(12) United States Patent
Liu et al.

(10) Patent No.: US 10,582,479 B2
(45) Date of Patent: Mar. 3, 2020

(54) RESOURCE SELECTION METHOD AND APPARATUS, AND ELECTRONIC DEVICE

(71) Applicant: HUAWEI TECHNOLOGIES CO., LTD., Shenzhen, Guangdong (CN)

(72) Inventors: Jianqin Liu, Beijing (CN); Ruiqi Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/934,336

(22) Filed: Mar. 23, 2018

(65) Prior Publication Data

US 2018/0213527 A1     Jul. 26, 2018

Related U.S. Application Data

(63) Continuation of application No. PCT/CN2015/090844, filed on Sep. 25, 2015.

(51) Int. Cl.
*H04W 72/04*  (2009.01)
*H04B 7/0456* (2017.01)
(Continued)

(52) U.S. Cl.
CPC ...... *H04W 72/0413* (2013.01); *H04B 7/0478* (2013.01); *H04W 24/10* (2013.01);
(Continued)

(58) Field of Classification Search
CPC ... H04W 24/10; H04W 72/044; H04B 7/0486
See application file for complete search history.

(56) References Cited

U.S. PATENT DOCUMENTS

2013/0155891 A1* 6/2013 Dinan ................. H04B 7/0456
370/252
2013/0322376 A1* 12/2013 Marinier ............... H04W 72/06
370/329

(Continued)

FOREIGN PATENT DOCUMENTS

| CN | 102859894 A | 1/2013 |
|---|---|---|
| CN | 103746779 A | 4/2014 |
| WO | 2014129858 A1 | 8/2014 |

OTHER PUBLICATIONS

"3GPP TS 36.211 V12.7.0 3rd Generation Partnership Project;Technical Specification Group Radio Access Network; Evolved Universal Terrestrial Radio Access (E-UTRA);Physical channels and modulation(Release 12),Technical Specification, Sep. 2015, 136 pages".

(Continued)

*Primary Examiner* — Chi H Pham
*Assistant Examiner* — Fahmida S Chowdhury
(74) *Attorney, Agent, or Firm* — Fish & Richardson P.C.

(57) ABSTRACT

The present disclosure includes example resource selection methods and apparatuses. The example method includes configuring a CSI process for a second device, where the CSI process corresponds to configuration information of K reference signal resources or configuration information of K reference signal antenna port groups. A reference signal is sent to the second device according to the configuration information corresponding to the CSI process, so that the second device obtains a corresponding channel quality measurement result by measuring the reference signal, where the channel quality measurement result includes a precoding matrix indicator (PMI). The PMI is used to indicate a serial number of a precoding matrix selected by the second device, and the selected precoding matrix is a matrix in a preset (Continued)

precoding matrix set, where the preset precoding matrix set is determined according to K and a quantity T of beams to be selected.

20 Claims, 6 Drawing Sheets

(51) Int. Cl.
    *H04W 24/10*     (2009.01)
    *H04W 72/08*     (2009.01)
    *H04B 7/10*     (2017.01)

(52) U.S. Cl.
    CPC ....... *H04W 72/044* (2013.01); *H04W 72/048* (2013.01); *H04W 72/085* (2013.01); *H04B 7/0486* (2013.01); *H04B 7/10* (2013.01)

(56) References Cited

U.S. PATENT DOCUMENTS

| | | | | |
|---|---|---|---|---|
| 2014/0192768 A1* | 7/2014 | Yeh | ...................... | H04B 7/0469 370/330 |
| 2014/0233498 A1 | 8/2014 | Chen et al. | | |
| 2014/0328426 A1 | 11/2014 | Kim et al. | | |
| 2015/0341092 A1 | 11/2015 | Park et al. | | |
| 2016/0142117 A1* | 5/2016 | Rahman | ............... | H04B 7/0469 375/267 |

OTHER PUBLICATIONS

International Search Report issued in International Application No. PCT/CN2015/090844 dated Jun. 14, 2016, 13 pages.
3GPP TSG RAN WG1 Meeting #82 R1-154180,"Extension of Rel.12 CSI reporting modes for Rel.13 FD-MIMO", Samsung,Aug. 24-28, 2015,total 4 pages.
3GPP TSG RAN Meeting #69 RP-151565,Status Report to TSG,"Elevation Beamforming/Full-Dimension (FD) MIMO for LTE",Samsung,Sep. 14-16, 2015,total 9 pages.
Extended European Search Report issued in European Application No. 15904520.2 dated Jun. 4, 2018, 20 pages.
R1-154950—Ericsson, "CSI feedback for FD-MIMO," 3GPP TSG-RAN WG1#82, Beijing, China, Aug. 24-28, 2015, pages.
R1-154277—LG Electronics, "Discussion on codebook design options for EBF/FD-MIMO," 3GPP TSG RAN WG1 Meeting #82, Beijing, China, Aug. 24-28, 2015, 9 pages.
Office Action issued in Korean Application No. 10-2018-7011432 dated Apr. 22, 2019, 6 pages. (with English translation).

\* cited by examiner

RESOURCE SELECTION METHOD AND APPARATUS, AND ELECTRONIC DEVICE

CROSS-REFERENCE TO RELATED APPLICATIONS

This application is a continuation of international application No. PCT/CN2015/090844, filed on Sep. 25, 2015, the disclosure of which is hereby incorporated by reference in its entirety.

TECHNICAL FIELD

The present invention relates to wireless communications technologies, and in particular, to a resource selection method and apparatus and an electronic device.

BACKGROUND

A multiple-input multiple-output (MIMO) technology has been widely used in a wireless communications system to improve a system capacity and ensure cell coverage. For example, multi-antenna-based transmit diversity, open-loop/closed-loop spatial multiplexing, and demodulation reference signal (DMRS)-based multi-stream transmission are used in a downlink transmission of an long term evolution (LTE) system. DMRS-based multi-stream transmission is a main transmission mode in an LTE-advanced (LTE-A) system and a subsequent system. A procedure of the DMRS-based multi-stream transmission is as follows: user equipment (UE) first performs channel measurement according to a channel state information reference signal (CSI-RS) configured by an evolved NodeB (eNB). A measurement result includes a transmission rank, a precoding matrix corresponding to the transmission rank, and a channel quality indicator (CQI) corresponding to the transmission rank and the precoding matrix. Then, the UE feeds back the measurement result to the eNB. The eNB further performs downlink scheduling according to the measurement result fed back by the UE, and sends, according to a scheduling result, a physical downlink shared channel (PDSCH) to the UE by using a DMRS.

In a communications standard such as a current LTE-A Rel-13 standard, mechanisms for CSI reporting and feedback in three-dimensional MIMO may be classified into a mechanism 1 in which a CSI-RS resource is not precoded and a mechanism 2 in which a CSI-RS resource is precoded. In the mechanism 2, to eliminate impact caused by a movement of the UE and improve CSI feedback accuracy, a base station usually sends multiple sets of precoded candidate reference signal resources to the UE for selection and reporting. Different from the mechanism 1 in which only CSI reporting is performed, in the mechanism 2, extra selection needs to be further performed on multiple sets of precoded resources.

In the mechanism 1, beam selection is usually directly bound to a rank. For example, when the rank is 3 or 4, a precoding matrix and a phase rotation part that are corresponding to orthogonal beams need to be selected. However, in the mechanism 2, a precoding matrix for the multiple sets of precoded candidate reference signal resources is unknown to the UE, and in the mechanism 2, the UE may need to report multiple sets of candidate reference signal resources to the base station in one rank. In the mechanism 2, beam or resource selection usually has no direct association with a rank. Therefore, a manner in the mechanism 1 for selecting a candidate reference signal resource cannot be used in the mechanism 2, and there is an urgent need for an effective solution that can be used in the mechanism 2 to select a candidate reference signal resource.

SUMMARY

Embodiments of the present invention provide a resource selection method and apparatus and an electronic device, so as to select a candidate reference signal resource in a mechanism 2.

To resolve the foregoing technical problem, the present invention discloses the following technical solutions:

According to a first aspect, a resource selection method is provided, where the method is applied to a first device, and the method includes:

configuring a channel state information (CSI) process for a second device, where the CSI process is corresponding to configuration information of K reference signal resources or configuration information of K reference signal antenna port groups, and K is a natural number; and sending a reference signal to the second device according to the configuration information corresponding to the CSI process, so that the second device obtains a corresponding channel quality measurement result by measuring the reference signal, where the channel quality measurement result includes a precoding matrix indicator (PMI), where the PMI is used to indicate a serial number of a precoding matrix selected by the second device, the selected precoding matrix is a matrix in a preset precoding matrix set, and the preset precoding matrix set is determined according to K and a quantity T of beams that need to be selected.

With reference to the first aspect, in a first possible implementation of the first aspect, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is $C_K^T$; and the second constituent part is used for phase modulation.

With reference to the first possible implementation of the first aspect, in a second possible implementation of the first aspect, elements in the set Y are column selection vectors used for beam selection or a matrix including the column selection vectors.

With reference to the second possible implementation of the first aspect, in a third possible implementation of the first aspect, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

With reference to the third possible implementation of the first aspect, in a fourth possible implementation of the first aspect, the set $Y_{k-1}$ is first $C_{K-1}^T$ elements in the set Y when elements are arranged according to serial numbers.

With reference to the second possible implementation of the first aspect, in a fifth possible implementation of the first aspect, the elements in the set are numbered according to the following rule:

for two elements whose column selection vectors that are in a same location in terms of element composition are both $e_i$, an element with a column selection vector that is after $e_i$ in terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

With reference to the first aspect, in a sixth possible implementation of the first aspect, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

With reference to the first aspect, in a seventh possible implementation of the first aspect, the method further includes:

receiving the channel quality measurement result reported by the second device; and communicating with the second device according to the channel quality measurement result.

According to a second aspect, a resource selection method is provided, where the method is applied to a second device, and the method includes:

receiving a reference signal sent by a first device according to configuration information corresponding to a channel state information (CSI) process, where the CSI process is a process configured by the first device for the second device, the CSI process is corresponding to configuration information of K reference signal resources or configuration information of K reference signal antenna port groups, and K is a natural number; and obtaining a corresponding channel quality measurement result by measuring the reference signal, where the channel quality measurement result includes a precoding matrix indicator (PMI), where the PMI is used to indicate a serial number of a precoding matrix selected by the second device, the selected precoding matrix is a matrix in a preset precoding matrix set, and the preset precoding matrix set is determined according to K and a quantity T of beams that need to be selected.

With reference to the second aspect, in a first possible implementation of the second aspect, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is $C_K^T$; and the second constituent part is used for phase modulation.

With reference to the first possible implementation of the second aspect, in a second possible implementation of the second aspect, elements in the set Y are column selection vectors used for beam selection or a matrix including the column selection vectors.

With reference to the second possible implementation of the second aspect, in a third possible implementation of the second aspect, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

With reference to the third possible implementation of the second aspect, in a fourth possible implementation of the second aspect, the set $Y_{k-1}$ is first $C_{K-1}^T$ elements in the set Y when elements are arranged according to serial numbers, With reference to the second possible implementation of the second aspect, in a fifth possible implementation of the second aspect, the elements in the set Y are numbered according to the following rule:

for two elements whose column selection vectors that are in a same location in terms of element composition are both $e_i$, an element with a column selection vector that is after $e_i$ in terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

With reference to the second aspect, in a sixth possible implementation of the second aspect, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

With reference to the second aspect, in a seventh possible implementation of the second aspect, the method further includes:

reporting the channel quality measurement result to the first device.

According to a third aspect, a resource selection apparatus is provided, where the apparatus is applied to a first device, and the apparatus includes:

a CSI process configuration module, configured to configure a channel state information (CSI) process for a second device, where the CSI process is corresponding to configuration information of K reference signal resources or configuration information of K reference signal antenna port groups, and K is a natural number; and a reference signal sending module, configured to send a reference signal to the second device according to the configuration information corresponding to the CSI process that is configured by the CSI process configuration module, so that the second device obtains a corresponding channel quality measurement result by measuring the reference signal, where the channel quality measurement result includes a precoding matrix indicator (PMI), where the PMI is used to indicate a serial number of a precoding matrix selected by the second device, the selected precoding matrix is a matrix in a preset precoding matrix set, and the preset precoding matrix set is determined according to K and a quantity T of beams that need to be selected.

With reference to the third aspect, in a first possible implementation of the third aspect, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is $C_K^T$; and the second constituent part is used for phase modulation.

With reference to the first possible implementation of the third aspect, in a second possible implementation of the third aspect, elements in the set Y are column selection vectors used for beam selection or a matrix including the column selection vectors.

With reference to the second possible implementation of the third aspect, in a third possible implementation of the third aspect, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

With reference to the third possible implementation of the third aspect, in a fourth possible implementation of the third aspect, the set $Y_{k-1}$ is first $C_{K-1}^T$ elements in the set Y when elements are arranged according to serial numbers.

With reference to the second possible implementation of the third aspect, in a fifth possible implementation of the third aspect, the elements in the set Y are numbered according to the following rule:

for two elements whose column selection vectors that are in a same location in terms of element composition are both $e_i$, an element with a column selection vector that is after $e_i$ in terms of element composition and that has a smaller subscript has a smaller serial number; or for two elements whose column selection vectors that are in a same location in terms of element composition are both $e_i$ an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

With reference to the third aspect, in a sixth possible implementation of the third aspect, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

With reference to the third aspect, in a seventh possible implementation of the third aspect, the apparatus further includes:

a channel quality measurement result receiving module, configured to receive the channel quality measurement result reported by the second device; and a communications module, configured to communicate with the second device according to the channel quality measurement result received by the channel quality measurement result receiving module.

According to a fourth aspect, a resource selection apparatus is provided, where the apparatus is applied to a second device, and the apparatus includes:

a reference signal receiving module, configured to receive a reference signal sent by a first device according to configuration information corresponding to a channel state information (CSI) process, where the CSI process is a process configured by the first device for the second device, the CSI process is corresponding to configuration information of K reference signal resources or configuration information of K reference signal antenna port groups, and K is a natural number; and a channel quality measurement result obtaining module, configured to obtain a corresponding channel quality measurement result by measuring the reference signal, where the channel quality measurement result includes a precoding matrix indicator (PMI), where the PMI is used to indicate a serial number of a precoding matrix selected by the second device, the selected precoding matrix is a matrix in a preset precoding matrix set, and the preset precoding matrix set is determined according to K and a quantity T of beams that need to be selected.

With reference to the fourth aspect, in a first possible implementation of the fourth aspect, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is $C_K^T$; and the second constituent part is used for phase modulation.

With reference to the first possible implementation of the fourth aspect, in a second possible implementation of the fourth aspect, elements in the set Y are column selection vectors used for beam selection or a matrix including the column selection vectors.

With reference to the second possible implementation of the fourth aspect, in a third possible implementation of the fourth aspect, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

With reference to the third possible implementation of the fourth aspect, in a fourth possible implementation of the fourth aspect, the set $Y_{k-1}$ is first $C_{K-1}^T$ elements in the set Y when elements are arranged according to serial numbers.

With reference to the second possible implementation of the fourth aspect, in a fifth possible implementation of the fourth aspect, the elements in the set Y are numbered according to the following rule:

for two elements whose column selection vectors that are in a same location in terms of element composition are both an element with a column selection vector that is after $e_i$ in terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

With reference to the fourth aspect, in a sixth possible implementation of the fourth aspect, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

With reference to the fourth aspect, in a seventh possible implementation of the fourth aspect, the apparatus further includes:

a channel quality measurement result reporting module, configured to report the channel quality measurement result to the first device.

According to a fifth aspect, an electronic device is provided, where the electronic device includes: a processor, a memory, a transceiver module, and a system bus; the processor, the memory, and the transceiver module are connected by using the system bus; the transceiver module is configured to receive and send a wireless signal; the memory is configured to store an instruction that can be executed by the processor; and the processor is configured to:

receive a reference signal sent by a first device according to configuration information corresponding to a channel state information (CSI) process, where the CSI process is a process configured by the first device for the electronic device, the CSI process is corresponding to configuration information of K reference signal resources or configuration information of K reference signal antenna port groups, and K is a natural number; and obtain a corresponding channel quality measurement result by measuring the reference signal, where the channel quality measurement result includes a precoding matrix indicator (PMI), where the PMI is used to indicate a serial number of a precoding matrix selected by the electronic device, the selected precoding matrix is a matrix in a preset precoding matrix set, and the preset precoding matrix set is determined according to K and a quantity T of beams that need to be selected.

The technical solutions provided in the present invention may include the following beneficial effects:

In the present invention, a base station and UE are used as an example. A precoding matrix set is preset in both the base station and the UE, and the precoding matrix set is designed to be related to a quantity K of reference signal resources corresponding to a CSI process and a quantity T of to-be-selected beams, but be unrelated to a rank. In this way, a candidate reference signal resource can be selected in the mechanism 2, and a design and storage of the precoding matrix set in different resource configurations are simplified, and three-dimensional MIMO performance is further optimized.

BRIEF DESCRIPTION OF DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1:
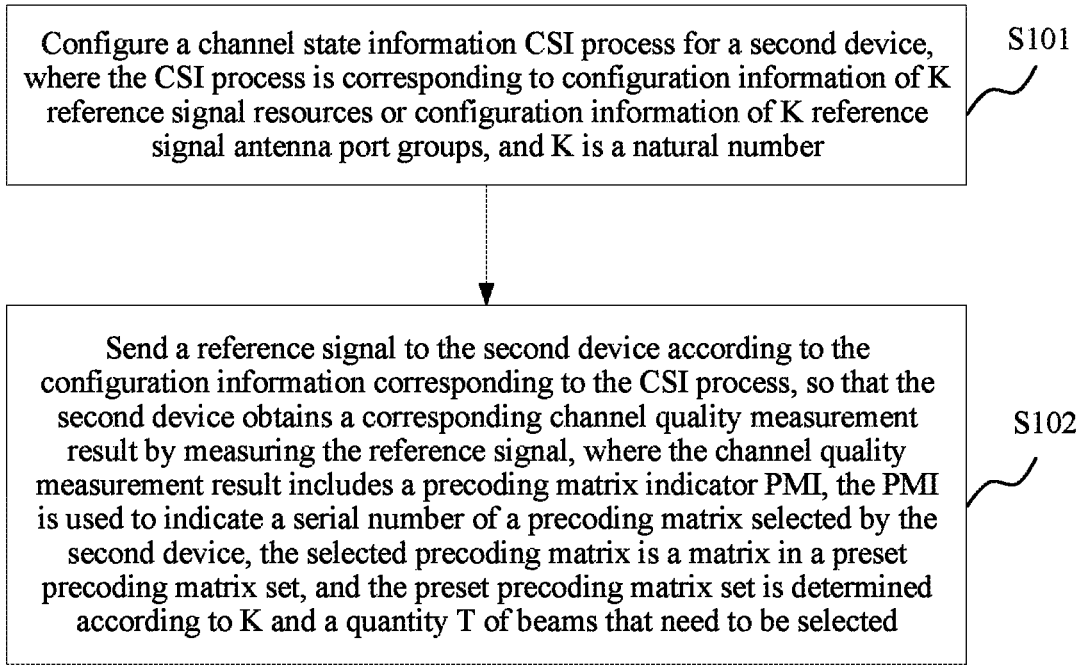
FIG. 1 is a schematic flowchart of a resource selection method according to an embodiment of the present invention.

FIG. 1 is a schematic flowchart of a resource selection method according to an embodiment of the present invention. The method may be applied to a first device. For example, the first device may be a base station. Referring to FIG. 1, the method includes the following steps:

Step S101: Configure a channel state information (CSI) process for a second device, where the CSI process is corresponding to configuration information of K reference signal resources or configuration information of K reference signal antenna port groups, and K is a natural number.

Step S102: Send a reference signal to the second device according to the configuration information corresponding to the CSI process, so that the second device obtains a corresponding channel quality measurement result by measuring the reference signal, where the channel quality measurement result includes a precoding matrix indicator (PMI).

The PMI is used to indicate a serial number of a precoding matrix selected by the second device, the selected precoding matrix is a matrix in a preset precoding matrix set, and the preset precoding matrix set is determined according to K and a quantity T of beams that need to be selected.

In an example, K may be set to 1, 2, 3, 4, 5, 6, 7, 8, or the like. In one case, that is, when K>1, each reference signal resource is associated with one to-be-selected candidate beam. In another case, that is, when K=1, one reference signal resource includes K groups of antenna ports, and each group of antenna ports is corresponding to one to-be-selected candidate beam. In addition, optionally, each group of antenna ports may include two ports in different polarization directions, that is, each antenna port group including two antenna ports is corresponding to one precoding matrix.

In this embodiment, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is $C_K^T$, and the second constituent part is used for phase modulation.

In an example, a precoding matrix set that is used for beam selection and that is applicable to all configurable values of K may be constructed, that is, a precoding matrix set may be predefined based on a maximum value of K. A constituent part that is in the set and used for beam selection is related only to two numbers: a quantity K of configured candidate reference signal resources or a quantity K of antenna port groups in the candidate reference signal resources; and a quantity T of resources or port groups that need to be selected, that is, a quantity T of beams that need to be selected. In addition to the constituent part used for beam selection, the set further includes a constituent part used for phase modulation such as phase rotation between two polarization directions.

In this embodiment, elements in the set Y are column selection vectors used for beam selection or a matrix including the column selection vectors.

The column selection vector is a column vector whose value is 1 in one dimension and is zero in another dimension.

In this embodiment, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

Further, the set $Y_{k-1}$ is first $C_{K-1}^T$ elements in the set Y when elements are arranged according to serial numbers.

The set Y may also be written as $Y_k$, and is of a nesting structure. $Y_{k-1}$ is nested into $Y_k$, and $Y_{k-2}$ is nested into $Y_{k-1}$, and so on.

From another point of view, the elements in the set Y may be numbered according to the following rule:

for two elements whose column selection vectors that are in a same location in terms of element composition are both $e_i$, an element with a column selection vector that is after $e_i$ terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

It should be additionally noted that this numbering rule is also applicable to another beam selection reporting manner. For example, second user equipment directly reports beam selection indication information, and if the second user equipment selects two candidate beams from a total of eight candidate beams, a quantity of all possible beam selection indications is $C_8^2$. A numbering rule of the $C_8^2$ elements may also be the foregoing numbering rule.

The following describes this embodiment with reference to specific examples.

(a) For example, when K=8 and T=1, a precoding matrix set with a size of $C_8^1$ may be of the following structure:

$$W \in C = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\},$$

where the first constituent part is a set of constituent parts used for beam selection:

$Y \in \{\tilde{e}_1, \tilde{e}_2, \tilde{e}_3, \tilde{e}_4, \tilde{e}_5, \tilde{e}_6, \tilde{e}_7, \tilde{e}_8\}$; and the second constituent part is the part used for phase modulation:

$$C_0 = \left\{ \frac{1}{\sqrt{2}}\begin{bmatrix} 1 \\ 1 \end{bmatrix}, \frac{1}{\sqrt{2}}\begin{bmatrix} 1 \\ j \end{bmatrix}, \frac{1}{\sqrt{2}}\begin{bmatrix} 1 \\ -1 \end{bmatrix}, \frac{1}{\sqrt{2}}\begin{bmatrix} 1 \\ -j \end{bmatrix} \right\},$$

where j is an imaginary unit, and $e_i$ is a column selection vector whose value is 1 in the $i^{th}$ dimension and is zero in all the other dimensions.

(b) For another example, when K=8 and T=2, a precoding matrix set W with a size of $C_8^2$ may be of the following structure:

$$W \in C = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}, \text{where}$$

$$(Y_1, Y_2) \in \begin{cases} (\tilde{e}_1, \tilde{e}_2), (\tilde{e}_1, \tilde{e}_3), (\tilde{e}_1, \tilde{e}_4), (\tilde{e}_1, \tilde{e}_5), (\tilde{e}_1, \tilde{e}_6), (\tilde{e}_1, \tilde{e}_7), (\tilde{e}_1, \tilde{e}_8) \\ (\tilde{e}_2, \tilde{e}_3), (\tilde{e}_2, \tilde{e}_4), (\tilde{e}_2, \tilde{e}_5), (\tilde{e}_2, \tilde{e}_6), (\tilde{e}_2, \tilde{e}_7), (\tilde{e}_2, \tilde{e}_8) \\ (\tilde{e}_3, \tilde{e}_4), (\tilde{e}_3, \tilde{e}_5), (\tilde{e}_3, \tilde{e}_6), (\tilde{e}_3, \tilde{e}_7), (\tilde{e}_3, \tilde{e}_8) \\ (\tilde{e}_4, \tilde{e}_5), (\tilde{e}_4, \tilde{e}_6), (\tilde{e}_4, \tilde{e}_7), (\tilde{e}_4, \tilde{e}_8) \\ (\tilde{e}_5, \tilde{e}_6), (\tilde{e}_5, \tilde{e}_7), (\tilde{e}_5, \tilde{e}_8) \\ (\tilde{e}_6, \tilde{e}_7), (\tilde{e}_6, \tilde{e}_8) \\ (\tilde{e}_7, \tilde{e}_8) \end{cases}$$

Orthogonality of each column is implemented by the UE by using a combination of resources or a combination of port groups.

The part used for phase modulation is as follows:

$$C_1 = \left\{ \frac{1}{\sqrt{2}}\begin{bmatrix} 1 & 1 \\ 1 & -1 \end{bmatrix}, \frac{1}{\sqrt{2}}\begin{bmatrix} 1 & 1 \\ j & -j \end{bmatrix} \right\}.$$

A precoding matrix set designed in the present invention is a precoding matrix set that is applicable to all configuration values of K. For example, for the foregoing precoding matrix set, when T=2 and K is changed from 8 to 7, a precoding matrix set with a size of $C_7^2$ may be obtained from the original precoding matrix set with the size of $C_8^2$. Specifically, Y in the precoding matrix set with the size of $C_7^2$ is as follows:

$$(Y_1, Y_2) \in \begin{cases} (\tilde{e}_1, \tilde{e}_2), (\tilde{e}_1, \tilde{e}_3), (\tilde{e}_1, \tilde{e}_4), (\tilde{e}_1, \tilde{e}_5), (\tilde{e}_1, \tilde{e}_6), (\tilde{e}_1, \tilde{e}_7) \\ (\tilde{e}_2, \tilde{e}_3), (\tilde{e}_2, \tilde{e}_4), (\tilde{e}_2, \tilde{e}_5), (\tilde{e}_2, \tilde{e}_6), (\tilde{e}_2, \tilde{e}_7) \\ (\tilde{e}_3, \tilde{e}_4), (\tilde{e}_3, \tilde{e}_5), (\tilde{e}_3, \tilde{e}_6), (\tilde{e}_3, \tilde{e}_7) \\ (\tilde{e}_4, \tilde{e}_5), (\tilde{e}_4, \tilde{e}_6), (\tilde{e}_4, \tilde{e}_7) \\ (\tilde{e}_5, \tilde{e}_6), (\tilde{e}_5, \tilde{e}_7) \\ (\tilde{e}_6, \tilde{e}_7) \end{cases}.$$

It can be easily learned that the foregoing $(Y_1, Y_2)$ is a part obtained after elements in the last oblique line in $(Y_1, Y_2)$ when T=2 and K=8 are deleted.

When T=2 and K is changed from 8 to 6, Y in a precoding matrix set with a size of $C_6^2$ is as follows:

$$(Y_1, Y_2) \in \begin{Bmatrix} (\tilde{e}_1, \tilde{e}_2), (\tilde{e}_1, \tilde{e}_3), (\tilde{e}_1, \tilde{e}_4), (\tilde{e}_1, \tilde{e}_5), (\tilde{e}_1, \tilde{e}_6) \\ (\tilde{e}_2, \tilde{e}_3), (\tilde{e}_2, \tilde{e}_4), (\tilde{e}_2, \tilde{e}_5), (\tilde{e}_2, \tilde{e}_6) \\ (\tilde{e}_3, \tilde{e}_4), (\tilde{e}_3, \tilde{e}_5), (\tilde{e}_3, \tilde{e}_6) \\ (\tilde{e}_4, \tilde{e}_5), (\tilde{e}_4, \tilde{e}_6) \\ (\tilde{e}_5, \tilde{e}_6) \end{Bmatrix}.$$

It can be easily learned that the foregoing $(Y_1, Y_2)$ is a part obtained after elements in the last oblique line in $(Y_1, Y_2)$ when T=2 and K=7 are deleted, that is, a part obtained after elements in the last two oblique lines in $(Y_1, Y_2)$ when T=2 and K=8 are deleted.

Because $C_{K+1}^T = C_k^T = C_K^{T-1}$, when K is changed to K-1, a precoding matrix set with a size of $C_k^T$ can be obtained by deleting the last $C_K^{T-1}$ elements in an original precoding matrix set. The foregoing nesting structure is applicable to any K and T defined above.

Optionally, the elements in the set Y may also be numbered starting from a line and according to columns. For example, when K=8 and T=2, serial numbers of the elements in Y may be as follows:

An element numbered 1 is $(\tilde{e}_1, \tilde{e}_2)$, an element numbered 2 is $(\tilde{e}_1, \tilde{e}_3)$, am element numbered 3 is $(\tilde{e}_2, \tilde{e}_3)$, an element numbered 4 is $(\tilde{e}_1, \tilde{e}_4)$, an element numbered 5 is $(\tilde{e}_2, \tilde{e}_4)$, an element numbered 6 is $(\tilde{e}_3, \tilde{e}_4)$, and so on. The following set is used as an example:

$$(Y_1, Y_2) \in \begin{Bmatrix} (\tilde{e}_1, \tilde{e}_2) \\ (\tilde{e}_1, \tilde{e}_3)(\tilde{e}_2, \tilde{e}_3) \\ (\tilde{e}_1, \tilde{e}_4)(\tilde{e}_2, \tilde{e}_4)(\tilde{e}_3, \tilde{e}_4) \\ (\tilde{e}_1, \tilde{e}_5)(\tilde{e}_1, \tilde{e}_5)(\tilde{e}_2, \tilde{e}_5)(\tilde{e}_4, \tilde{e}_5) \\ (\tilde{e}_1, \tilde{e}_6)(\tilde{e}_2, \tilde{e}_6)(\tilde{e}_3, \tilde{e}_6)(\tilde{e}_4, \tilde{e}_6)(\tilde{e}_5, \tilde{e}_6) \\ (\tilde{e}_1, \tilde{e}_7)(\tilde{e}_2, \tilde{e}_7)(\tilde{e}_3, \tilde{e}_7)(\tilde{e}_4, \tilde{e}_7)(\tilde{e}_5, \tilde{e}_7)(\tilde{e}_6, \tilde{e}_7) \\ (\tilde{e}_1, \tilde{e}_8)(\tilde{e}_2, \tilde{e}_8)(\tilde{e}_3, \tilde{e}_8)(\tilde{e}_4, \tilde{e}_8)(\tilde{e}_5, \tilde{e}_8)(\tilde{e}_6, \tilde{e}_8)(\tilde{e}_7, \tilde{e}_8) \end{Bmatrix}.$$

That is, numbering is first performed according to a subscript of the second column selection vector in each element in Y, and for elements in which the second column selection vectors have a same subscript, an element in which the first column selection vector has a smaller subscript is first numbered. In other words, an element in which the last column selection vector is $\tilde{e}_i$ is numbered before an element in which the last column selection vector is $\tilde{e}_j$, where i and j are natural numbers, and i<j. In conclusion, a numbering rule in this case is as follows: for two elements whose column selection vectors that are in a same location in terms of element composition are both $e_i$, an element with a column selection vector that is before $e_i$ in terms of element composition and that has a smaller subscript has a smaller serial number.

Considering that feedback overheads of the user equipment are huge when a quantity of candidate beams is relatively large, some element combinations may be prevented from appearing in a precoding matrix set used for a beam selection indication, especially in some precoding matrices for a beam selection indication when a rank is high. For example, a whole set of a precoding matrix set for a beam selection indication when the rank is 3 or 4 may be expressed as follows:

$$(Y_1, Y_2) \in$$

$$\begin{Bmatrix} (\tilde{e}_1, \tilde{e}_2, \tilde{e}_3), (\tilde{e}_1, \tilde{e}_2, \tilde{e}_4), (\tilde{e}_1, \tilde{e}_2, \tilde{e}_5), (\tilde{e}_1, \tilde{e}_2, \tilde{e}_6), (\tilde{e}_1, \tilde{e}_2, \tilde{e}_7), (\tilde{e}_1, \tilde{e}_2, \tilde{e}_8) \\ (\tilde{e}_1, \tilde{e}_3, \tilde{e}_4), (\tilde{e}_1, \tilde{e}_3, \tilde{e}_5), (\tilde{e}_1, \tilde{e}_3, \tilde{e}_6), (\tilde{e}_1, \tilde{e}_3, \tilde{e}_7), (\tilde{e}_1, \tilde{e}_3, \tilde{e}_8) \\ (\tilde{e}_1, \tilde{e}_4, \tilde{e}_5), (\tilde{e}_1, \tilde{e}_4, \tilde{e}_6), (\tilde{e}_1, \tilde{e}_4, \tilde{e}_7), (\tilde{e}_1, \tilde{e}_4, \tilde{e}_8) \\ (\tilde{e}_1, \tilde{e}_5, \tilde{e}_6), (\tilde{e}_1, \tilde{e}_5, \tilde{e}_7), (\tilde{e}_1, \tilde{e}_5, \tilde{e}_8) \\ (\tilde{e}_1, \tilde{e}_6, \tilde{e}_7), (\tilde{e}_1, \tilde{e}_6, \tilde{e}_8) \\ (\tilde{e}_1, \tilde{e}_7, \tilde{e}_8) \end{Bmatrix} +$$

$$\begin{Bmatrix} (\tilde{e}_2, \tilde{e}_3, \tilde{e}_4), (\tilde{e}_2, \tilde{e}_3, \tilde{e}_5), (\tilde{e}_2, \tilde{e}_3, \tilde{e}_6), (\tilde{e}_2, \tilde{e}_3, \tilde{e}_7), (\tilde{e}_2, \tilde{e}_3, \tilde{e}_8) \\ (\tilde{e}_2, \tilde{e}_4, \tilde{e}_5), (\tilde{e}_2, \tilde{e}_4, \tilde{e}_6), (\tilde{e}_2, \tilde{e}_4, \tilde{e}_7), (\tilde{e}_2, \tilde{e}_4, \tilde{e}_8) \\ (\tilde{e}_2, \tilde{e}_5, \tilde{e}_6), (\tilde{e}_2, \tilde{e}_5, \tilde{e}_7), (\tilde{e}_2, \tilde{e}_5, \tilde{e}_8) \\ (\tilde{e}_2, \tilde{e}_6, \tilde{e}_7), (\tilde{e}_2, \tilde{e}_6, \tilde{e}_8) \\ (\tilde{e}_2, \tilde{e}_7, \tilde{e}_8) \end{Bmatrix} +$$

$$\begin{Bmatrix} (\tilde{e}_3, \tilde{e}_4, \tilde{e}_5), (\tilde{e}_3, \tilde{e}_4, \tilde{e}_6), (\tilde{e}_3, \tilde{e}_4, \tilde{e}_7), (\tilde{e}_3, \tilde{e}_4, \tilde{e}_8) \\ (\tilde{e}_3, \tilde{e}_5, \tilde{e}_6), (\tilde{e}_3, \tilde{e}_5, \tilde{e}_7), (\tilde{e}_3, \tilde{e}_5, \tilde{e}_8) \\ (\tilde{e}_3, \tilde{e}_6, \tilde{e}_7), (\tilde{e}_3, \tilde{e}_6, \tilde{e}_8) \\ (\tilde{e}_3, \tilde{e}_7, \tilde{e}_8) \end{Bmatrix} +$$

$$\begin{Bmatrix} (\tilde{e}_4, \tilde{e}_5, \tilde{e}_6), (\tilde{e}_4, \tilde{e}_5, \tilde{e}_7), (\tilde{e}_4, \tilde{e}_5, \tilde{e}_8) \\ (\tilde{e}_4, \tilde{e}_6, \tilde{e}_7), (\tilde{e}_4, \tilde{e}_6, \tilde{e}_8) \\ (\tilde{e}_4, \tilde{e}_7, \tilde{e}_8) \end{Bmatrix} + \begin{Bmatrix} (\tilde{e}_5, \tilde{e}_6, \tilde{e}_7), (\tilde{e}_5, \tilde{e}_6, \tilde{e}_8) \\ (\tilde{e}_5, \tilde{e}_7, \tilde{e}_8) \end{Bmatrix} + \{(\tilde{e}_6, \tilde{e}_7, \tilde{e}_8)\}$$

To reduce reporting and feedback overheads of a user equipment, the base station may limit a beam selection indication matrix when the rank is 3 or 4, and the matrix may be expressed as follows:

An element in which subscript numbers of column selection vectors have a same interval is selected. For example, all elements in which subscript numbers of column selection vectors have an interval of 2, such as $(\tilde{e}_1, \tilde{e}_3, \tilde{e}_5)$ and $(\tilde{e}^2, \tilde{e}_4, \tilde{e}_6)$, may be selected to form the beam selection indication matrix.

The base station may configure a downsampling parameter of the precoding matrix set for a beam selection indication. For example, in different ranks, the base station may configure or limit the precoding matrix set for a beam selection indication as a set including all elements in which subscript numbers of column selection vectors have a same interval. Therefore, the reporting and feedback overheads of the user can be reduced.

When the precoding matrix set for a beam selection indication is jointly determined according to a rank indicator and a quantity of beams that need to be selected, each precoding matrix in the precoding matrix set may include vectors with a same column selection vector serial number.

Optionally, the second device may separately report beam selection information and other channel state information such as a PMI, a CQI, an RI, and a PTI. For example, the second device directly reports the beam selection indication information, and preferably, there may be two manners: bitmap and bit coding. In the former manner, the second device directly expresses the beam selection indication information in a form of a bitmap. For example, when a beam selection indication is that first two beams are selected from eight candidate beams, a corresponding bitmap form is: 11000000. However, in the latter manner, when it also needs to indicate that two beams are selected from eight candidate beams, there are C(8, 2)=28 possible candidate indication options. Therefore, at least five information bits are needed, and a numbering rule of 32 status values corresponding to the five information bits is the same as that described above. That is, the numbering rule in claim 6 is also applicable to all cases in which the second device directly reports the beam selection indication information.

More generally, the precoding matrix in the solution of the present invention may include only the first constituent part Y used for a beam selection indication, that is, each element in the final precoding matrix set includes only a matrix used for a beam selection indication. In this case, all features applicable to the first constituent part discussed in the solution of the present invention fall within the protection scope of the present invention.

In addition, the channel quality measurement result may further include at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

In the mechanism 2, a channel state information feedback mainly includes a serial number of a precoding matrix used for beam selection and phase rotation, and other information such an rank indicator (RI), a precoding type indicator (PTI), and a CQI. Therefore, a quantity of feedback bits in the mechanism 2 is mainly related to a total quantity K of beams and a quantity T of beams that need to be selected. Beam selection is generally a wideband. Therefore, a maximum quantity of feedback bits in the present invention may reuse a joint coding/report type used for a wideband CQI and a second PMI and a joint coding/report type used for a wideband CQI, a first PMI, and a second PMI, where the two joint coding/report types are in current physical uplink control channel (PUCCH) report types 2b and 2c. In addition, a new coding type (such as a PUCCH format 2d) may also be used. In the new coding type, the quantity of feedback bits is determined according to the total quantity K of beams and the quantity T of the beams that need to be selected. The coding type reuses the current PUCCH report types 2b and 2c.

For a definition of a new PUCCH report type used for coding and reporting of beam selection information or joint coding and reporting of beam selection information and other channel state information, refer to Table 1 below. An antenna port quantity (i) represents a quantity of the $i^{th}$ type of antenna ports, and a beam selection quantity (i) represents a quantity of the $i^{th}$ type of beams that need to be selected. M, N, and P are natural numbers greater than or equal to 1. PUCCH 2x is a new report type used for a beam selection indication. The beam selection indication may be in a form of a precoding matrix, or in another form of a non-precoding matrix. However, the precoding matrix may be of a precoding matrix type 1 used for only the beam selection indication, or may be of a precoding matrix type 2 used for both the beam selection indication and an indication of phase rotation between two polarization directions (for details, referring to the foregoing embodiment). In addition, regardless of the type 1 or the type 2, generation of each precoding matrix in the precoding matrix set Y used for a beam selection indication is determined according to a rank indicator, that is, precoding matrices generated according to different rank indicators are different. Specifically, for example, a rank 1 or 2 is corresponding to the precoding matrix type 1 used for a beam selection indication, and a rank 3 or 4 is corresponding to the precoding matrix type 2 used for a beam selection indication.

When the precoding matrix is of the precoding matrix type 1, precoding matrix indicator information reported and fed back by the user may be divided into the following two or three parts:

$$W = W_1 \otimes W_2, \text{ or}$$

$$W = W_1 \otimes (W_{21} \times W_{22}).$$

W is a total precoding matrix obtained by the base station or user side, $W_1$ is a matrix used for beam selection, and a precoding matrix that is in a latter half of a Kronecker product is a precoding matrix obtained by means of measurement based on a reference signal resource corresponding to the selected beams. When the total precoding matrix W is of a single codebook structure in an LTE 3GPP standard, $W_2$ is a precoding matrix obtained by means of measurement based on a reference signal resource corresponding to the selected beams. When the matrix is of a double codebook structure in an LTE 3GPP standard, $W_{21}$ is the first precoding matrix in the double codebook structure, and $W_{22}$ is the second precoding matrix in the double codebook structure.

To reduce overheads and design complexity of a user equipment feedback, in a feasible uplink control information design, feedback bits used for $W_2$, $W_{21}$, or $W_{22}$ may be divided into a first part and a second part. Feedback bits of the first part are used for the beam selection indication matrix $W_1$, and feedback bits of the second part are used for $W_2$, $W_{21}$, or $W_{22}$.

An essence of this solution is to reduce or limit the feedback bits of $W_2$, $W_{21}$, or $W_{22}$, so as to limit a codebook subset correspondingly used by $W_2$, $W_{21}$, or $W_{22}$.

Preferably, in a double codebook structure of Rel-10, a first precoding matrix set is corresponding to four bit streams. The base station may configure a codebook subset with a size of two bit streams for the first precoding matrix set as a limitation, so that the remaining two bit streams may be allocated to a precoding matrix set used for beam selection.

A beam selection precoding matrix based on at most four candidate beams (two bit streams) may be expressed in the following column selection vector form:

$$\begin{bmatrix}1\\0\\0\\0\end{bmatrix} \begin{bmatrix}0\\0\\1\\0\end{bmatrix} \begin{bmatrix}0\\1\\0\\0\end{bmatrix} \begin{bmatrix}0\\0\\0\\1\end{bmatrix},$$

where 1 in the $i^{th}$ location in a column section vector includes that the $i^{th}$ beam is selected, where i=0, 1, 2, or 3.

Therefore, in the foregoing solution, a feedback of the precoding matrix used for beam selection may be used as a part of the feedback bits of $W_2$, $W_{21}$, or $W_{22}$ in 3GPP LTE Rel-10. Therefore, both a PUCCH feedback type and a PUCCH feedback mode in Re-10 may be reused.

When the beam selection indication is in a form of a precoding matrix, corresponding beam selection indication information is a serial number of the precoding matrix. When the beam selection indication is in another form, the corresponding beam selection indication information is a serial number in another form.

The beam selection indication information may be jointly coded and reported with any other channel state information, or the beam selection indication information may be reported separately, and this is specifically shown in Table 2.

TABLE 2

| PUCCH Report Type | Report Content | Reporting Condition | PUCCH Report Mode (such as 1-1) |
|---|---|---|---|
| 2x | Beam selection indication information | Antenna port quantity (1) and quantity (1) of selected beams, or antenna port quantity (1) and rank indicator (1) | M bits (reuse bits of the PUCCH report type 2c or 2b) |
| | Beam selection indication information | Antenna port quantity (2), and quantity (2) of selected beams | N bits (reuse bits of the PUCCH report type 2c or 2b) |
| | Beam selection indication information | Antenna port quantity (3) and quantity (3) of selected beams, or antenna port quantity (3) and rank indicator (3) | P bits (reuse bits of the PUCCH report type 2c or 2b) |

When the beam selection indication information is reported separately, the beam selection indication information may be reported after an RI, or may be jointly reported with an RI, and this is not limited herein.

Alternatively, the beam selection indication information may be jointly reported with a first precoding matrix indicator (PMI)1, a wideband CQI, or the like. A report coding format and a report type of the beam selection indication information should reuse as much as possible a PUCCH report type and a PUCCH report coding format in a current LTE standard.

Table 3 below shows a new PUCCH report type 2d when it is assumed that P=8 and T=K=1, 2, . . . , 7, or 8, and the new PUCCH report type 2d is applicable to a PMI used for beam selection and phase rotation.

TABLE 1

| PUCCH Report Type | Report Content | Reporting Condition | PUCCH Report Mode (such as 1-1) |
|---|---|---|---|
| 2x | Other CSI information (such as a wideband CQI)/beam selection indication information | Antenna port quantity (1) and quantity (1) of selected beams, or antenna port quantity (1) and rank indicator (1) | M bits (reuse bits of the PUCCH report type 2c or 2b) |
| | Other CSI information (such as a wideband CQI)/beam selection indication information | Antenna port quantity (2) and quantity (2) of selected beams, or antenna port quantity (2) and rank indicator (2) | N bits (reuse bits of the PUCCH report type 2c or 2b) |
| | Other CSI information (such as a wideband CQI)/beam selection indication information | Antenna port quantity (3) and quantity (3) of selected beams, or antenna port quantity (3) and rank indicator (3) | P bits (reuse bits of the PUCCH report type 2c or 2b) |

TABLE 3

| PUCCH Report Type | Report Content | Reporting Condition | PUCCH Report Mode (such as 1-1) |
|---|---|---|---|
| 2d | Wideband CQI/Beam selection indication information | Antenna port quantity 8, and quantity (1 or 7) of selected beams | 9 bits (reuse bits of the PUCCH report type 2c or 2b) |
| | Wideband CQI/Beam selection indication information | Antenna port quantity 8, and quantity (2 or 6) of selected beams | 10 bits (reuse bits of the PUCCH report type 2c or 2b) |
| | Wideband CQI/Beam selection indication information | Antenna port quantity 8, and quantity (3, 4, or 5) of selected beams | 11 bits (reuse bits of the PUCCH report type 2c or 2b) |

Optionally, in the mechanism 2, a quantity of channel state information feedback bits is related to at least two of the rank indicator, the total beam quantity K, or the quantity T of the beams that need to be selected. Specifically, this further includes: The quantity of feedback bits is related to a rank and the total beam quantity K. Herein, the total beam quantity K may be equivalent to the antenna port quantity.

Figure 2:
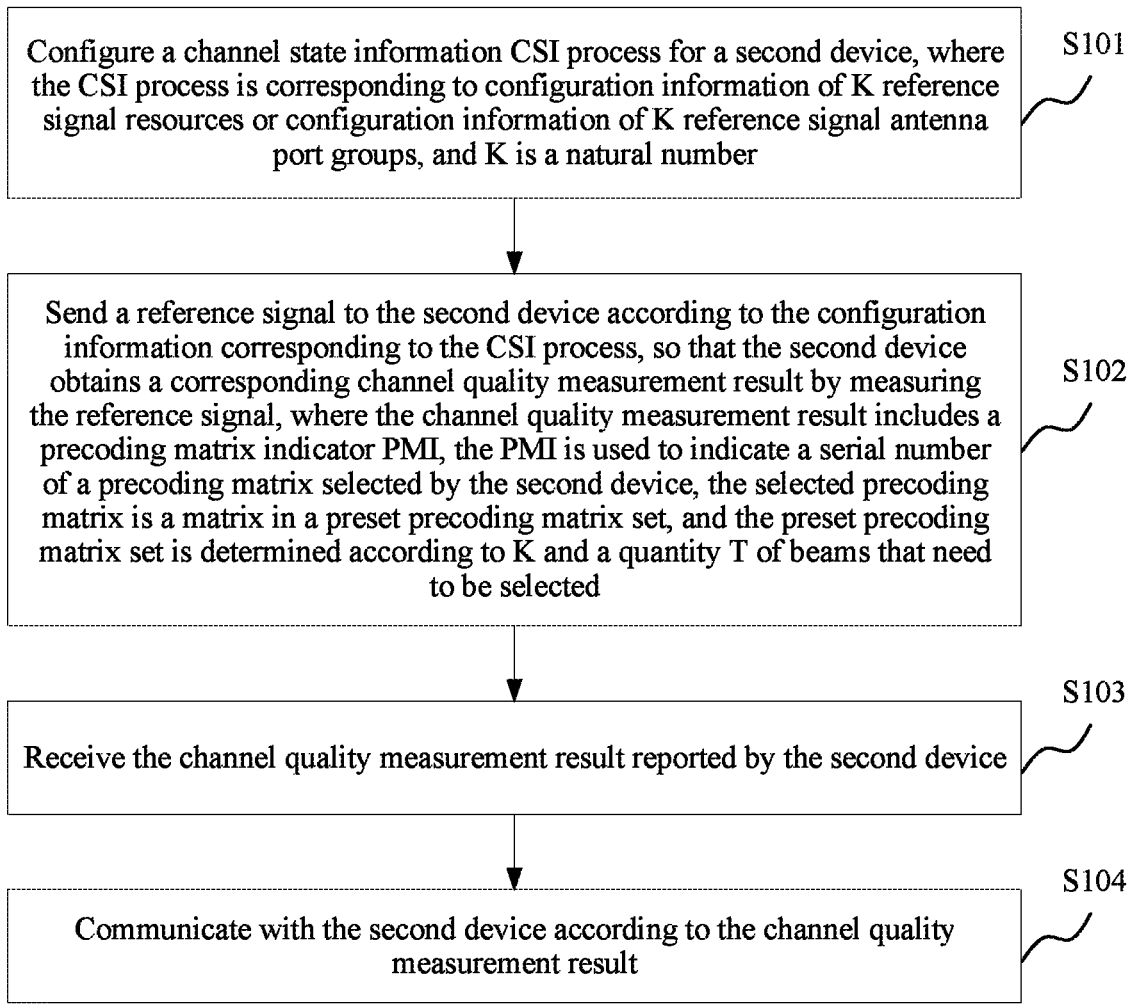
FIG. 2 is a schematic flowchart of a resource selection method according to an embodiment of the present invention.

In addition, referring to FIG. 2, the method may further include:

Step S103: Receive the channel quality measurement result reported by the second device.

Step S104: Communicate with the second device according to the channel quality measurement result.

In this embodiment of the present invention, a base station and UE are used as an example. A precoding matrix set is preset in both the base station and the UE, and the precoding matrix set is designed to be related to a quantity K of reference signal resources corresponding to a CSI process and a quantity T of beams that need to be selected, but be unrelated to a rank. In this way, a candidate reference signal resource can be selected in the mechanism 2, and a design and storage of the precoding matrix set in different resource configurations are simplified, and three-dimensional MIMO performance is further optimized.

Figure 3:
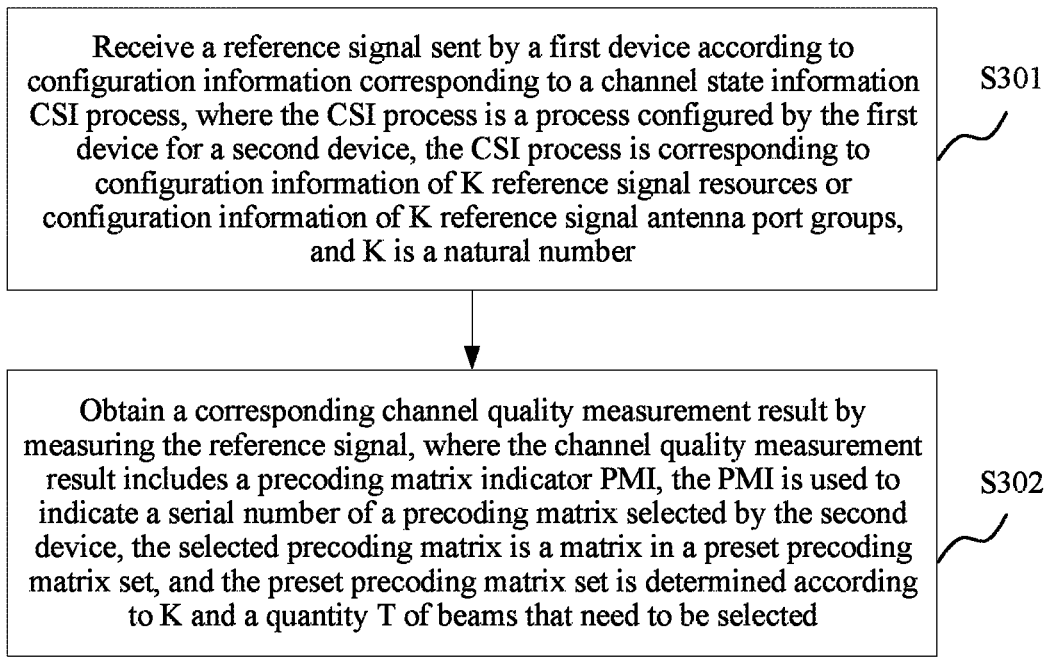
FIG. 3 is a schematic flowchart of a resource selection method according to an embodiment of the present invention.

FIG. 3 is a schematic flowchart of a resource selection method according to an embodiment of the present invention. The method may be applied to a second device. The second device may be a user terminal such as a mobile phone or a tablet computer. Referring to FIG. 3, the method includes the following steps:

Step S301: Receive a reference signal sent by a first device according to configuration information corresponding to a channel state information (CSI) process, where the CSI process is a process configured by the first device for the second device, the CSI process is corresponding to configuration information of K reference signal resources or configuration information of K reference signal antenna port groups, and K is a natural number.

Step S302: Obtain a corresponding channel quality measurement result by measuring the reference signal, where the channel quality measurement result includes a precoding matrix indicator (PMI).

The PMI is used to indicate a serial number of a precoding matrix selected by the second device, the selected precoding matrix is a matrix in a preset precoding matrix set, and the preset precoding matrix set is determined according to K and a quantity T of beams that need to be selected.

In this embodiment or some other embodiments of the present invention, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is a combination $C_K^T$; and the second constituent part is used for phase modulation.

In this embodiment or some other embodiments of the present invention, elements in the set Y are column selection vectors used for beam selection or a matrix including the column selection vectors.

In this embodiment or some other embodiments of the present invention, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

In this embodiment or some other embodiments of the present invention, the set $Y_{k-1}$ is first $C_{K-1}^T$ elements in the set Y when elements are arranged according to serial numbers.

In this embodiment or some other embodiments of the present invention, the elements in the set Y are numbered according to the following rule:

for two elements whose column selection vectors that are in a same location in terms of element composition are both $e_i$, an element with a column selection vector that is after $e_j$ in terms of element composition and that has a smaller subscript has a smaller serial number; or for two elements whose column selection vectors that are in a same location in terms of element composition are both $e_i$, an element with a column selection vector that is before $e_j$ in terms of element composition and that has a smaller subscript has a smaller serial number, where $e_i$ indicates a column selection vector whose value is 1 in the $i^{th}$ dimension and is zero in all the other dimensions.

In this embodiment or some other embodiments of the present invention, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

Figure 4:
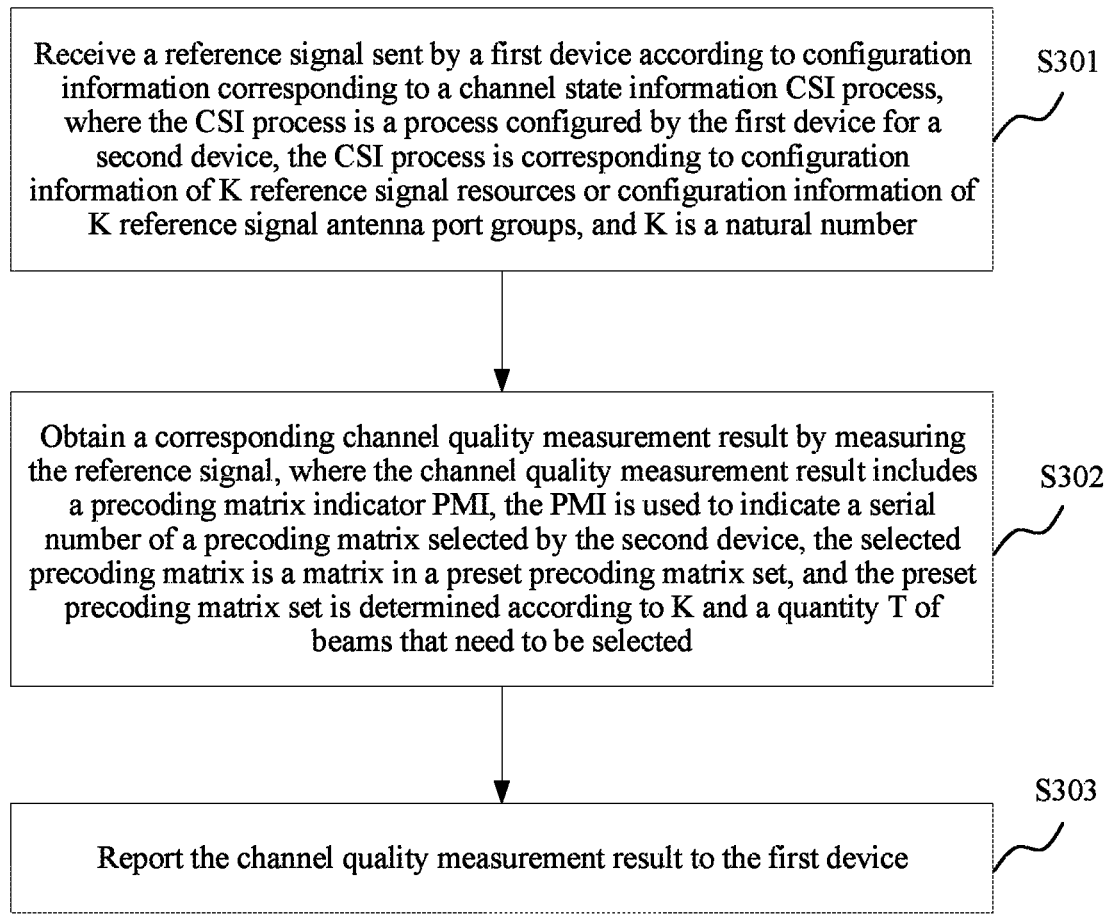
FIG. 4 is a schematic flowchart of a resource selection method according to an embodiment of the present invention.

Referring to FIG. 4, in this embodiment or some other embodiments of the present invention, the method may further include:

Step S303: Report the channel quality measurement result to the first device.

In this embodiment of the present invention, a base station and UE are used as an example. A precoding matrix set is preset in both the base station and the UE, and the precoding matrix set is designed to be related to a quantity K of reference signal resources corresponding to a CSI process and a quantity T of beams that need to be selected, but be unrelated to a rank. In this way, a candidate reference signal resource can be selected in a mechanism 2, and a design and storage of the precoding matrix set in different resource configurations are simplified, and three-dimensional MIMO performance is further optimized.

Figure 5:
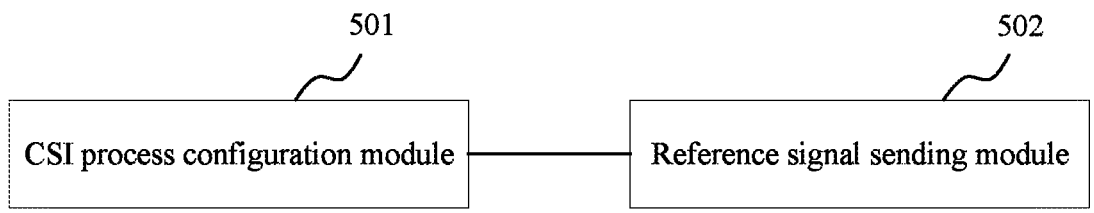
FIG. 5 is a block diagram of a resource selection apparatus according to an embodiment of the present invention.

FIG. 5 is a block diagram of a resource selection apparatus according to an embodiment of the present invention. The apparatus may be applied to a first device, and the apparatus includes:

a CSI process configuration module 501; configured to configure a channel state information (CSI) process for a second device, where the CSI process is corresponding to configuration information of K reference signal resources or configuration information of K reference signal antenna port groups, and K is a natural number; and a reference signal sending module 502, configured to send a reference signal to the second device according to the configuration information corresponding to the CSI process that is configured by the CSI process configuration module 501, so that the second device obtains a corresponding channel quality measurement result by measuring the reference signal, where the channel quality measurement result includes a precoding matrix indicator (PMI).

The PMI is used to indicate a serial number of a precoding matrix selected by the second device, the selected precoding matrix is a matrix in a preset precoding matrix set, and the preset precoding matrix set is determined according to K and a quantity T of beams that need to be selected.

In this embodiment or some other embodiments of the present invention, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is a combination $C_K^T$; and the second constituent part is used for phase modulation.

In this embodiment or some other embodiments of the present invention, elements in the set Y are column selection vectors used for beam selection or a matrix including the column selection vectors.

In this embodiment or some other embodiments of the present invention, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

In this embodiment or some other embodiments of the present invention, the set $Y_{k-1}$ is first $C_{K-1}^T$ elements in the set Y when elements are arranged according to serial numbers.

In this embodiment or some other embodiments of the present invention, the elements in the set Y are numbered according to the following rule:

for two elements whose column selection vectors that are in a same location in terms of element composition are both $e_i$ an element with a column selection vector that is after $e_j$ in terms of element composition and that has a smaller subscript has a smaller serial number; or for two elements whose column selection vectors that are in a same location in terms of element composition are both $e_i$, an element with a column selection vector that is before $e_j$ in terms of element composition and that has a smaller subscript has a smaller serial number, where $e_i$ indicates a column selection vector whose value is 1 in the $i^{th}$ dimension and is zero in all the other dimensions.

In this embodiment or some other embodiments of the present invention, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T or the rank indicator.

Figure 6:
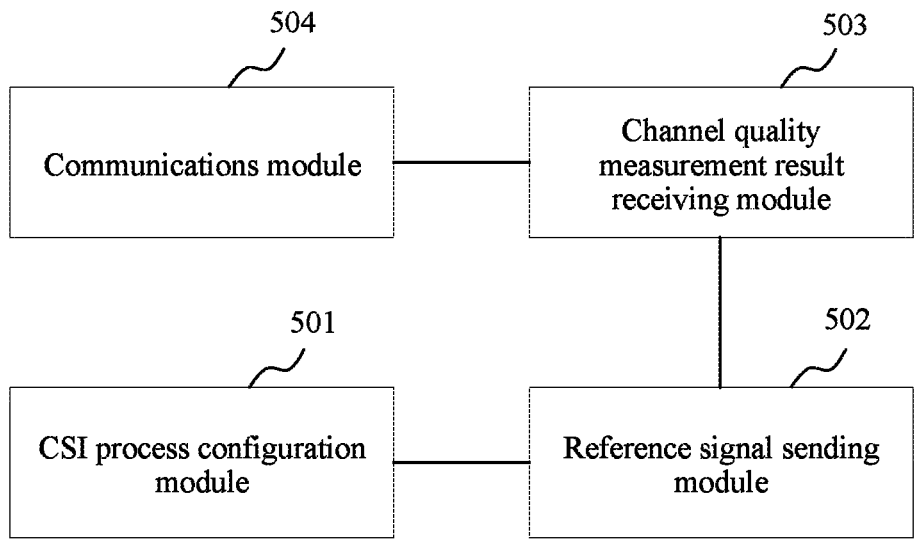
FIG. 6 is a block diagram of a resource selection apparatus according to an embodiment of the present invention.

Referring to FIG. 6, in this embodiment or some other embodiments of the present invention, the apparatus may further include:

a channel quality measurement result receiving module 503, configured to receive the channel quality measurement result reported by the second device; and a communications module 504, configured to communicate with the second device according to the channel quality measurement result received by the channel quality measurement result receiving module.

In this embodiment of the present invention, a base station and UE are used as an example. A precoding matrix set is preset in both the base station and the UE, and the precoding matrix set is designed to be related to a quantity K of reference signal resources corresponding to a CSI process and a quantity T of beams that need to be selected, but be unrelated to a rank. In this way, a candidate reference signal resource can be selected in a mechanism 2, and a design and storage of the precoding matrix set in different resource configurations are simplified, and three-dimensional MIMO performance is further optimized.

Figure 7:
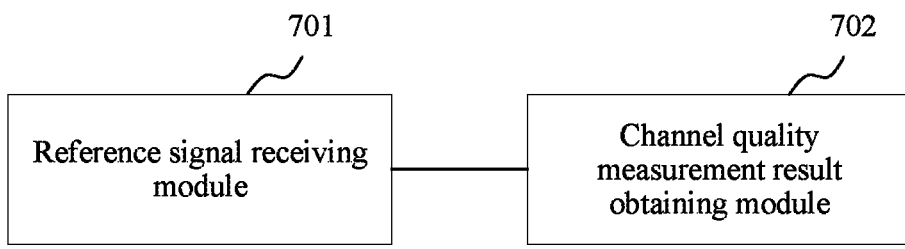
FIG. 7 is a block diagram of a resource selection apparatus according to an embodiment of the present invention.

FIG. 7 is a block diagram of a resource selection apparatus according to an embodiment of the present invention. The apparatus may be applied to a second device, and the apparatus includes:

a reference signal receiving module 701, configured to receive a reference signal sent by a first device according to configuration information corresponding to a channel state information (CSI) process, where the CSI process is a process configured by the first device for the second device, the CSI process is corresponding to configuration information of K reference signal resources or configuration information of K reference signal antenna port groups, and K is a natural number; and a channel quality measurement result obtaining module 702, configured to obtain a corresponding channel quality measurement result by measuring the reference signal, where the channel quality measurement result includes a precoding matrix indicator (PMI).

The PMI is used to indicate a serial number of a precoding matrix selected by the second device, the selected precoding matrix is a matrix in a preset precoding matrix set, and the preset precoding matrix set is determined according to K and a quantity T of beams that need to be selected.

In this embodiment or some other embodiments of the present invention, each precoding matrix in the precoding matrix set may be split into a first constituent part and a second constituent part; the first constituent part is used for beam selection, first constituent parts of all precoding matrices in the precoding matrix set form a set Y, and a quantity of elements in the set Y is a combination $C_K^T$; and the second constituent part is used for phase modulation.

In this embodiment or some other embodiments of the present invention, elements in the set Y are column selection vectors used for beam selection or a matrix including the column selection vectors.

In this embodiment or some other embodiments of the present invention, a subset including $C_{K-1}^T$ elements in the set Y is the same as a set $Y_{k-1}$, and the set $Y_{k-1}$ is a set including the first constituent parts in all the precoding matrices in the precoding matrix set when a quantity of reference signal resources corresponding to the CSI process or a quantity of reference signal antenna port groups corresponding to the CSI process is K−1 and the quantity of the beams that need to be selected is T.

In this embodiment or some other embodiments of the present invention, the set $Y_{k-1}$ is first $C_{K-1}^T$ elements in the set Y when elements are arranged according to serial numbers.

In this embodiment or some other embodiments of the present invention, the elements in the set Y are numbered according to the following rule:

for two elements whose column selection vectors that are in a same location in terms of element composition are both an element with a column selection vector that is after $e_i$ in terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, where $e_i$ indicates a column selection vector whose value is 1 in the $i^{th}$ dimension and is zero in all the other dimensions.

In this embodiment or some other embodiments of the present invention, the channel quality measurement result further includes at least one of a channel quality indicator (CQI), a rank indicator (RI), or a precoding type indicator (PTI); and respective physical uplink control channel (PUCCH) report types or a joint PUCCH report type of the PMI and the at least one of the CQI, the RI, or the PTI are determined according to at least two of K, T, or the rank indicator.

Figure 8:
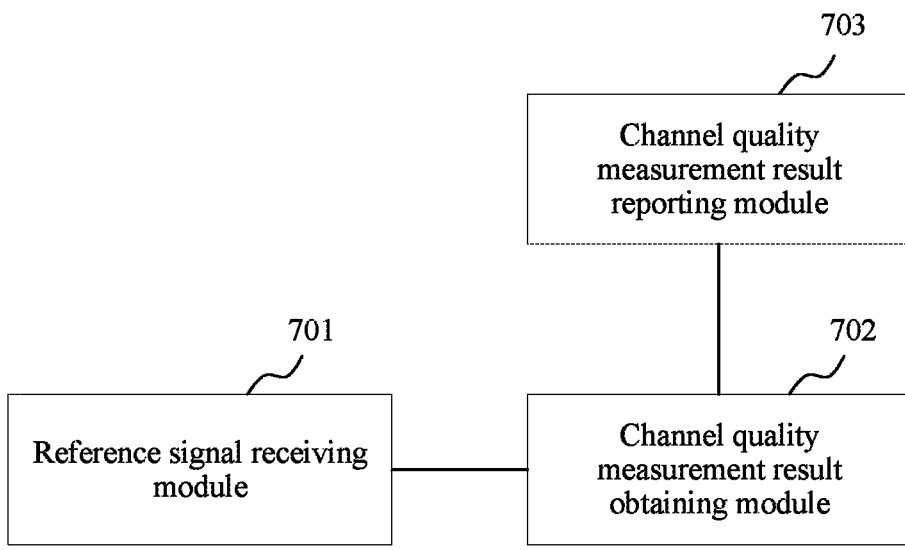
FIG. 8 is a block diagram of a resource selection apparatus according to an embodiment of the present invention.

Referring to FIG. 8, in this embodiment or some other embodiments of the present invention, the apparatus may further include:

a channel quality measurement result reporting module 703, configured to report the channel quality measurement result to the first device.

In this embodiment of the present invention, a base station and UE are used as an example. A precoding matrix set is preset in both the base station and the UE, and the precoding matrix set is designed to be related to a quantity K of reference signal resources corresponding to a CSI process and a quantity T of beams that need to be selected, but be unrelated to a rank. In this way, a candidate reference signal resource can be selected in a mechanism 2, and a design and storage of the precoding matrix set in different resource configurations are simplified, and three-dimensional MIMO performance is further optimized.

Figure 9:
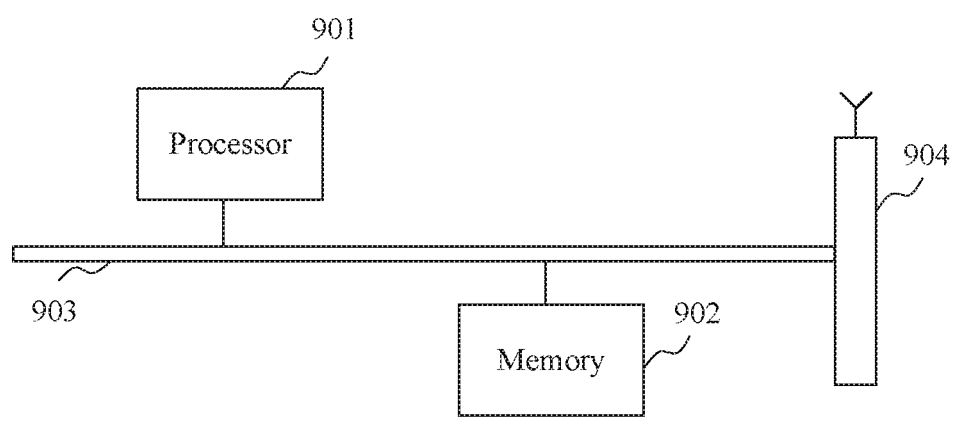
FIG. 9 is a schematic diagram of an electronic device according to an embodiment of the present invention.

FIG. 9 is a schematic diagram of an electronic device according to an embodiment of the present invention. The electronic device may be a mobile terminal such as a mobile phone or a tablet computer.

The electronic device includes: a processor 901, a memory 902, a transceiver module 903, and a system bus 904. The processor 901, the memory 902, and the transceiver module 903 are connected by using the system bus 904. The transceiver module 903 is configured to receive and send a wireless signal. The memory 902 is configured to store an instruction that can be executed by the processor 901.

The processor 901 is configured to:

receive a reference signal sent by a first device according to configuration information corresponding to a channel state information (CM) process, where the CSI process is a process configured by the first device for the electronic device, the CSI process is corresponding to configuration information of K reference signal resources or configuration information of K reference signal antenna port groups, and K is a natural number; and obtain a corresponding channel quality measurement result by measuring the reference signal, where the channel quality measurement result includes a precoding matrix indicator (PMI).

The PMI is used to indicate a serial number of a precoding matrix selected by the electronic device, the selected precoding matrix is a matrix in a preset precoding matrix set, and the preset precoding matrix set is determined according to K and a quantity T of beams that need to be selected.

The present invention can be described in the general context of executable computer instructions executed by a computer, for example, a program module. Generally, the program unit includes a routine, program, object, component, data structure, and the like for executing a particular task or implementing a particular abstract data type. The present invention may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementations of the present invention. It should be noted that a person of ordinary skill n the art may make several improvements or polishing without departing from the principle of the present invention and the improvements or polishing shall fall within the protection scope of the present invention.

What is claimed is:

1. A resource selection method, wherein the method is applied to a second device, and the method comprises:

receiving a reference signal sent by a first device according to configuration information corresponding to a channel state information (CSI) process, wherein the CSI process is a process configured by the first device for the second device, wherein the CSI process corresponds to configuration information of K reference signal resources or configuration information of K reference signal antenna port groups, and wherein K is a natural number; and obtaining a corresponding channel quality measurement result by measuring the reference signal, wherein the channel quality measurement result comprises a precoding matrix indicator (PMI), wherein the PMI is used to indicate a serial number of a precoding matrix selected by the second device, wherein the selected precoding matrix is a matrix in a preset precoding matrix set, wherein the preset precoding matrix set is preset in the first device and the second device, and wherein the preset precoding matrix set is determined according to K and a quantity T of beams to be selected.

2. The method according to claim 1, wherein each precoding matrix in the precoding matrix set is capable of being split into a first constituent part and a second constituent part, wherein the first constituent part is used for beam selection, wherein first constituent parts of all precoding matrices in the precoding matrix set form a set Y, wherein a quantity of elements in the set Y is a combination $C_K^T$, and wherein the second constituent part is used for phase modulation.

3. The method according to claim 2, wherein elements in the set Y are at least one of column selection vectors used for beam selection or a matrix comprising the column selection vectors.

4. The method according to claim 3, wherein a subset comprising $C_{K-1}^T$ elements in the set Y is the same as a set $Y_{k-1}$, and wherein the set $Y_{k-1}$ is a set comprising the first constituent parts in all the precoding matrices in the precoding matrix set when a quantity of reference signal resources corresponding to the CSI process or a quantity of reference signal antenna port groups corresponding to the CSI process is K−1 and the quantity of the beams to be selected is T.

5. The method according to claim 4, wherein the set $Y_{k-1}$ is first $C_{K-1}^T$ elements in the set Y when elements are arranged according to serial numbers.

6. The method according to claim 3, wherein the elements in the set Y are numbered according to the following rule:
for two elements whose column selection vectors that are in a same location in terms of element composition are both $e_i$, an element with a column selection vector that is after $e_i$ in terms of element composition and that has a smaller subscript has a smaller serial number; or
for two elements whose column selection vectors that are in a same location in terms of element composition are both $e_i$, an element with a column selection vector that is before $e_i$ in terms of element composition and that has a smaller subscript has a smaller serial number, wherein
$e_i$ indicates a column selection vector whose value is 1 in the $i^{th}$ dimension and is zero in all the other dimensions.

7. A resource selection apparatus, wherein the apparatus is applied to a first device, and the apparatus comprises:
at least one processor, the at least one processor configured to configure a channel state information (CSI) process for a second device, wherein the CSI process corresponds to configuration information of K reference signal resources or configuration information of K reference signal antenna port groups, and wherein K is a natural number; and
a transmitter, the transmitter configured to send a reference signal to the second device according to the configuration information corresponding to the CSI process configured by the at least one processor, wherein the second device obtains a corresponding channel quality measurement result by measuring the reference signal, wherein the channel quality measurement result comprises a precoding matrix indicator (PMI), wherein the PMI is used to indicate a serial number of a precoding matrix selected by the second device, wherein the selected precoding matrix is a matrix in a preset precoding matrix set, wherein the preset precoding matrix set is preset in the first device and the second device, and wherein the preset precoding matrix set is determined according to K and a quantity T of beams to be selected.

8. The apparatus according to claim 7, wherein each precoding matrix in the precoding matrix set is capable of being split into a first constituent part and a second constituent part, wherein the first constituent part is used for beam selection, wherein first constituent parts of all precoding matrices in the precoding matrix set form a set Y, wherein a quantity of elements in the set Y is a combination $C_K^T$, and wherein the second constituent part is used for phase modulation.

9. The apparatus according to claim 8, wherein elements in the set Y are at least one of column selection vectors used for beam selection or a matrix comprising the column selection vectors.

10. The apparatus according to claim 9, wherein a subset comprising $C_{K-1}^T$ elements in the set Y is the same as a set $Y_{k-1}$, and wherein the set $Y_{k-1}$ is a set comprising the first constituent parts in all the precoding matrices in the precoding matrix set when a quantity of reference signal resources corresponding to the CSI process or a quantity of reference signal antenna port groups corresponding to the CSI process is K−1 and the quantity of the beams to be selected is T.

11. The apparatus according to claim 10, wherein the set $Y_{k-1}$ is first $C_{K-1}^T$ elements in the set Y when elements are arranged according to serial numbers.

12. The apparatus according to claim 9, wherein the elements in the set Y are numbered according to the following rule:
for two elements whose column selection vectors that are in a same location in terms of element composition are both $e_i$, an element with a column selection vector that is after $e_i$ in terms of element composition and that has a smaller subscript has a smaller serial number; or
for two elements whose column selection vectors that are in a same location in terms of element composition are both $e_i$, an element with a column selection vector that is before $e_i$ in terms of element composition and that has a smaller subscript has a smaller serial number, wherein
$e_i$ indicates a column selection vector whose value is 1 in the $i^{th}$ dimension and is zero in all the other dimensions.

13. The apparatus according to claim 7, wherein the channel quality measurement result further comprises at least one of a channel quality indicator (CQI), a rank indicator (RI), and a precoding type indicator (PTI), and wherein respective physical uplink control channel (PUCCH) report types or a joint PUCCH report type of the PMI and the at least one of the CQI, the RI, or the PTI are determined according to at least two of K, T, and the rank indicator.

14. A resource selection apparatus, wherein the apparatus is applied to a second device, and the apparatus comprises:
a receiver, the receiver configured to receive a reference signal sent by a first device according to configuration information corresponding to a channel state information (CSI) process, wherein the CSI process is a process configured by the first device for the second device, wherein the CSI process is corresponding to configuration information of K reference signal resources or configuration information of K reference signal antenna port groups, and wherein K is a natural number; and at least one processor, the at least one processor configured to obtain a corresponding channel quality measurement result by measuring the reference signal, wherein the channel quality measurement result comprises a precoding matrix indicator (PMI), wherein the PMI is used to indicate a serial number of a precoding matrix selected by the second device, wherein the selected precoding matrix is a matrix in a preset precoding matrix set, wherein the preset precoding matrix set is preset in the first device and the second device, and wherein the preset precoding matrix set is determined according to K and a quantity T of beams to be selected.

15. The apparatus according to claim 14, wherein each precoding matrix in the precoding matrix set is capable of being split into a first constituent part and a second constituent part, wherein the first constituent part is used for beam selection, wherein first constituent parts of all precoding matrices in the precoding matrix set form a set Y, wherein a quantity of elements in the set Y is a combination $C_K^T$, and wherein the second constituent part is used for phase modulation.

16. The apparatus according to claim 15, wherein elements in the set Y are at least one of column selection vectors used for beam selection or a matrix comprising the column selection vectors.

17. The apparatus according to claim 16, wherein a subset comprising $C_{K-1}^T$ elements in the set Y is the same as a set $Y_{k-1}$, and wherein the set $Y_{k-1}$ is a set comprising the first constituent parts in all the precoding matrices in the precoding matrix set when a quantity of reference signal resources corresponding to the CSI process or a quantity of reference signal antenna port groups corresponding to the CSI process is K−1 and the quantity of the beams to be selected is T.

18. The apparatus according to claim 17, wherein the set $Y_{k-1}$ is first $C_{K-1}^T$ elements in the set Y when elements are arranged according to serial numbers.

19. The apparatus according to claim 16, wherein the elements in the set Y are numbered according to the following rule:

for two elements whose column selection vectors that are in a same location in terms of element composition are both $e_i$, an element with a column selection vector that is after $e_i$ in terms of element composition and that has a smaller subscript has a smaller serial number; or for two elements whose column selection vectors that are in a same location in terms of element composition are both $e_i$, an element with a column selection vector that is before $e_i$ in terms of element composition and that has a smaller subscript has a smaller serial number, wherein $e_i$ indicates a column selection vector whose value is 1 in the $i^{th}$ dimension and is zero in all the other dimensions.

20. The apparatus according to claim 14, wherein the channel quality measurement result further comprises at least one of a channel quality indicator (CQI), a rank indicator (RI), and a precoding type indicator (PTI), and wherein respective physical uplink control channel (PUCCH) report types or a joint PUCCH report type of the PMI and the at least one of the CQI, the RI, or the PTI are determined according to at least two of K, T, and the rank indicator.

* * * * *